US011797282B2

(12) United States Patent
Vecera et al.

(10) Patent No.: US 11,797,282 B2
(45) Date of Patent: Oct. 24, 2023

(54) OPTIMIZING SERVICES DEPLOYMENT IN A CLOUD COMPUTING ENVIRONMENT

(71) Applicant: RED HAT, INC., Raleigh, NC (US)

(72) Inventors: Martin Vecera, Brno (CZ); Marek Baluch, Nové Mesto nad Váhom (SK)

(73) Assignee: Red Hat, Inc., Raleigh, NC (US)

( * ) Notice: Subject to any disclaimer, the term of this patent is extended or adjusted under 35 U.S.C. 154(b) by 237 days.

(21) Appl. No.: 17/313,477

(22) Filed: May 6, 2021

(65) Prior Publication Data

US 2022/0357935 A1  Nov. 10, 2022

(51) Int. Cl.
| | |
|---|---|
| G06F 8/60 | (2018.01) |
| G06F 9/455 | (2018.01) |
| G06F 9/50 | (2006.01) |
| H04L 67/10 | (2022.01) |

(52) U.S. Cl.
CPC .............. G06F 8/60 (2013.01); G06F 9/455 (2013.01); G06F 9/5027 (2013.01); H04L 67/10 (2013.01)

(58) Field of Classification Search
None
See application file for complete search history.

(56) References Cited

U.S. PATENT DOCUMENTS

| | | | | |
|---|---|---|---|---|
| 8,984,121 B1 * | 3/2015 | Labat | ............ | G06F 8/70 709/224 |
| 9,348,622 B2 | 5/2016 | Emelyanov et al. | | |
| 9,986,031 B2 | 5/2018 | Jain et al. | | |
| 10,210,024 B2 | 2/2019 | Bhimani et al. | | |
| 10,782,934 B1 * | 9/2020 | Chawda | ................ | G06F 8/30 |
| 11,204,961 B1 * | 12/2021 | Farber | ................. | H04L 67/61 |
| 11,321,217 B1 * | 5/2022 | Agarwal | ............ | G06F 11/3409 |

(Continued)

FOREIGN PATENT DOCUMENTS

| | | |
|---|---|---|
| CN | 104951360 A | 9/2015 |
| CN | 111190688 A | 5/2020 |
| EP | 3226134 A1 * | 10/2017 ......... G06F 16/9024 |

OTHER PUBLICATIONS

Ochei et al., "Optimal Deployment of Components of Cloud-Hosted Application for Guaranteeing Multitenancy Isolation", School of Computing and Digital Media, Robert Gordon University, Aberdeen UK, 2019, pages. https://journalofcloudcomputing.springeropen.com/articles/10.1186/s13677-018-0124-5.

(Continued)

Primary Examiner — Philip Wang
(74) Attorney, Agent, or Firm — Lowenstein Sandler LLP

(57) ABSTRACT

Systems and methods of the disclosure include: identifying, by a processing device, a plurality of services of a cloud computing environment, wherein each service of the plurality of services employs one or more virtual execution environments; generating a plurality of graphs, wherein each graph of the plurality of graphs represents a service of the plurality of services, wherein each graph comprises a plurality of nodes, such that each node represents a corresponding virtual execution environment of the one or more virtual execution environments employed by the service, and wherein each node is associated with a computing resource usage indicator reflecting a usage of a computing resource by the corresponding virtual execution environment; and determining, using the plurality of graphs, a set of servers for running the plurality of services.

20 Claims, 6 Drawing Sheets

(56) References Cited

U.S. PATENT DOCUMENTS

| | | | |
|---|---|---|---|
| 11,381,483 B2* | 7/2022 | Bhatnagar | H04L 43/0817 |
| 11,582,485 B1* | 2/2023 | Cherian | H04N 19/107 |
| 2013/0055091 A1* | 2/2013 | Dutta | G06F 3/04842 |
| | | | 715/736 |
| 2013/0185715 A1* | 7/2013 | Dunning | G06F 9/45558 |
| | | | 718/1 |
| 2014/0278326 A1* | 9/2014 | Sharma | G06F 9/5066 |
| | | | 703/13 |
| 2016/0226736 A1* | 8/2016 | Tran | G06F 16/9024 |
| 2019/0102157 A1* | 4/2019 | Caldato | G06F 9/547 |
| 2021/0019194 A1* | 1/2021 | Bahl | H04L 67/1031 |
| 2021/0286813 A1* | 9/2021 | Pfitzmann | G06Q 30/0201 |
| 2021/0377184 A1* | 12/2021 | Singh | G06F 11/3466 |
| 2022/0052933 A1* | 2/2022 | Bhatnagar | H04L 47/826 |
| 2022/0070189 A1* | 3/2022 | Liu | G06F 21/64 |

OTHER PUBLICATIONS

Wan et al., "Application Deployment using Microservice and Docker Containers: Framework and Optimization", Department of Computer Science and Technology, Nanjing Tech University, China; School of Computer Science and Electric Engineering, University of Missouri—Kansas City, USA, 2018, pages. https://www.sciencedirect.com/science/article/abs/pii/S1084804518302273.

\* cited by examiner

OPTIMIZING SERVICES DEPLOYMENT IN A CLOUD COMPUTING ENVIRONMENT

TECHNICAL FIELD

The disclosure is generally related to cloud computing systems, and more particularly, to optimizing services deployment in a cloud computing environment.

BACKGROUND

Cloud computing is generally becoming the platform of choice for businesses that want to reduce operating expenses and be able to scale resources rapidly. Eased automation, flexibility, mobility, resiliency, and redundancy are several of the advantages of moving resources to the cloud. Many organizations are being introduced to cloud computing by building an Infrastructure-as-a-Service (IaaS) cloud, which delivers computing, storage, and networking resources to users.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
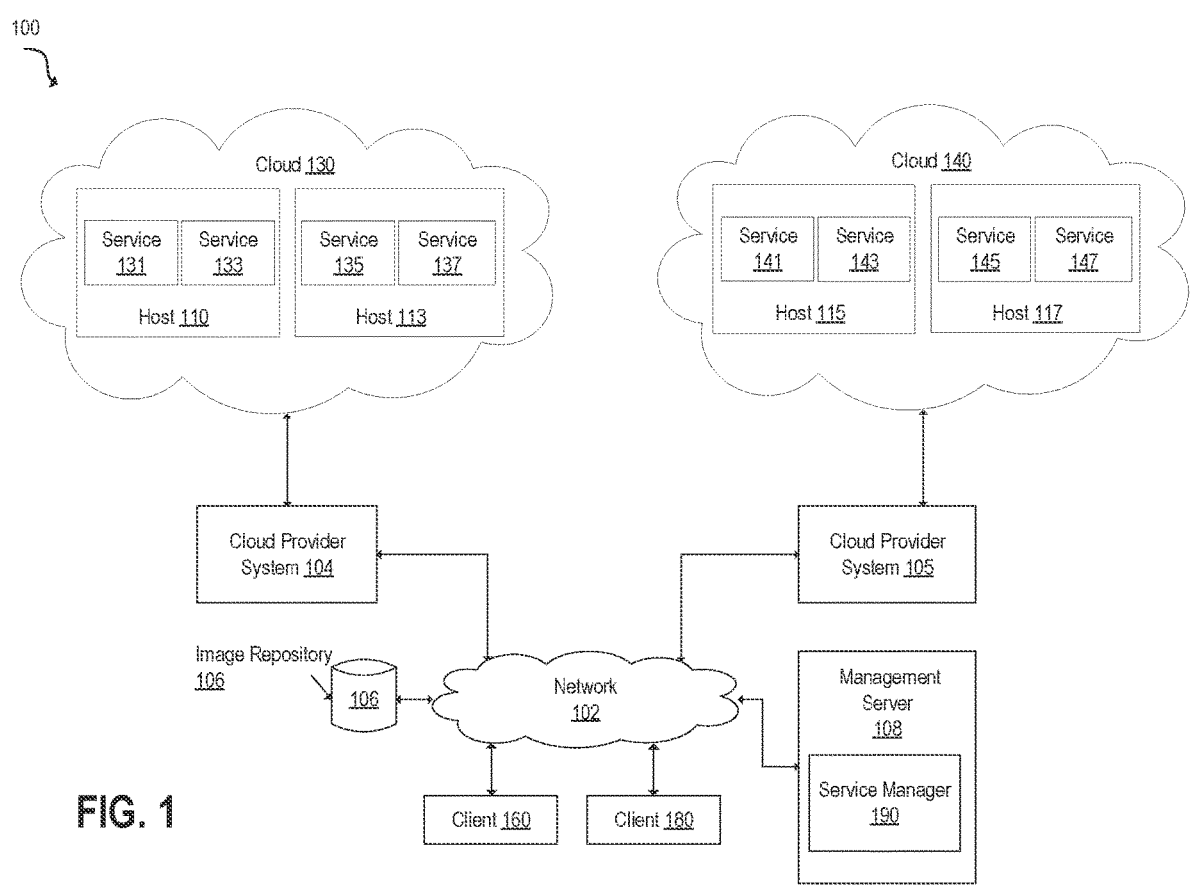
FIG. 1 depicts a high-level block diagram of an example computer system architecture, in accordance with one or more aspects of the disclosure.

Described herein are systems and methods for optimizing services deployment in a cloud computing environment. The cloud computing environment is a collection of computing resources that delivers computing services to users over a network. In the following disclosure, computing resources refer to, among other things, virtual machine instances, including virtual central processing units (vCPUs), memory, disk space, and/or virtual networks. A management server may manage the deployment of services in the cloud computing environment. The management server may receive a request to deploy a set of services in a cloud computing environment. The services may be deployed to provide a particular functionality (e.g., an application) in the cloud computing environment.

Providing a particular functionality (e.g., an application) in the cloud computing environment may require deploying one or more services. Each service may be deployed (e.g., by the management server) in a virtual execution environment. The virtual execution environment may include one or more virtual machines or one or more Docker® containers. Docker® containers ("containers") are a standardized unit of software that enables the running of isolated environments on a single server. Each service may have specific resource requirements, such as an expected central processing units (CPU) utilization, memory utilization, and storage utilization. Each virtual machine or container (i.e., the virtual execution environment) running each service may require different distributions of resources in order to run.

In some implementations of cloud computing environments, each service may be deployed separately in a virtual execution environment containing one or more virtual machines or one or more containers. Since each service may have different resource requirements, the virtual machines and/or containers may have unequal utilization of resources. For example, a service may require the use of three containers. One of these containers may require a much higher memory usage and CPU usage than the other two containers. The other two containers may have the capacity to handle more resources, such as CPU usage or memory usage. This may result in the underutilization of some containers. Given this underutilization of virtual machines or containers in the deployment of services, there may be an increase in power consumption in order to run more virtual machines or containers than necessary when deploying services. Consequently, given the inefficiency of deploying services using virtual machines or containers that may be underutilized, there may be an increase in cost in order to provide functionalities such as applications in a cloud computing environment, since applications often require the deployment of multiple services which may require the use of multiple virtual execution environments.

Aspects of the disclosure address the above-noted and other deficiencies by providing systems and methods that optimize services deployment in a cloud computing environment. In implementations of the disclosure, the management server may identify a set of services of a cloud computing environment to be deployed. The services may employ one or more virtual execution environments, such as one or more virtual machines or one or more containers. The resource service of the management server may further generate a graph to represent each service. The graph may include a set of nodes and a set of edges interconnecting the nodes. Each node may represent one of the virtual execution environments that the services employ. A node may be associated (e.g., by a metadata record) with a computing resource usage indicator of the container, and an edge may be associated (e.g., by a metadata record) with a network usage indicator of the container. Accordingly, the management server may use the generated graph for identifying a set of servers for running the services. In particular, the management server may identify the minimal set of servers suitable for running the services. The management server may combine two or more of the generated graphs into a single graph, which would represent the set of servers to be used for running the services. By combining two or more graphs, the management server may optimize the resources being utilized for each container, while ensuring that the resource requirements of the services are satisfied. Thus, multiple virtual execution environments for a service may be replaced by a lower number of virtual execution environments configured to host the service. As such, there may be a reduction in the cost of deploying services, since fewer virtual execution environments and resources need to be used.

The systems and methods described herein include technology that enhances utilization of computing resources, such as processor usage and memory usage, for a computer system. In particular, aspects of the disclosure provide technology that enhances the efficiency and/or performance of a computing system by reducing the failure rate of computing resource provisioning operations.

Various aspects of the above referenced methods and systems are described in details herein below by way of examples, rather than by way of limitation.

FIG. 1 is a block diagram of a network architecture 100 for a distributed computing system, in which embodiments of the invention may operate. The network architecture 100 may include multiple clouds (networks of computing resources) 130, 140 managed by various cloud provider systems 104, 105. There may be any number of clouds 130, 140 and cloud provider systems 104, 105. For brevity and simplicity, two clouds 130, 140 are used as an example throughout this document. In an embodiment, the network architecture includes clouds from multiple cloud providers, and multiple clouds may be provided by a single cloud provider. The clouds 130, 140 deploys services 131-137, 141-147. There may be any number of services 131-137, 141-147 being deployed in a cloud 130, 140. For brevity and simplicity, four services 131-137, 141-147 in each cloud 130, 140 are used as an example in architecture 100. For example, cloud 130 deploys services 131, 133, 135, and 137, and cloud 140 deploys services 141, 143, 145, and 147.

Services 131-137, 141-147, as discussed herein, may refer to a computing resource, such as virtual machine instances, disk storage, memory, vCPUs, or networks, for example. Each service 131-137, 141-147 is hosted or enabled on a physical machine configured as part of the cloud 130, 140. Such physical machines are often located in a data center. For example, services 131 and 133 are hosted on host 110 in cloud 130 provided by cloud provider system 104, services 135 and 137 are hosted on host 113 in cloud 130 provided by cloud provider system 104, services 141 and 143 are hosted on host 115 in cloud 140 provided by cloud provider system 105, and services 145 and 147 are hosted on host 117 in cloud 140 provided by cloud provider system 105.

The cloud provider systems 104, 105 and clouds 130, 140 may be provided as an infrastructure as a service (IaaS) layer. The cloud provider systems 104, 105 and clouds 130, 140 may be provided by, for example, a third party cloud provider or an organization including consumers of cloud 130, 140. For example, cloud provider system 104 and cloud 130 may be provided by Cloud-Provider-1, and cloud provider system 105 and cloud 140 may be provided by Cloud-Provider-2. A cloud provider may provide more than one type of cloud provider system 104, 105 and more than one type of cloud 130, 140. The cloud provider may be an entity. An entity, as referred to here, may represent any person, a business organization such as a corporation, an educational institution such as a college or university, etc. Users may interact with applications executing on cloud-based virtual machines using client computer systems, such as clients 160, 180. Users may have one or more accounts associated with a cloud provider system 104, 105.

Clients 160, 180 are connected to hosts 110, 113, 115, 117 and cloud provider systems 104, 105 via a network 102, which may be may be a private network (e.g., a local area network (LAN), a wide area network (WAN), intranet, or other similar private networks) or a public network (e.g., the Internet). Each client 160, 180 may be a mobile device, a PDA, a laptop, a desktop computer, or any other computing device. Each host 110, 113, 115, 117 may be a server computer system, a desktop computer or any other computing device. The cloud provider system 104, 105 may include one or more machines such as server computers, desktop computers, etc.

In one embodiment, the cloud provider system 104, 105 is coupled to a management server 108 via the network 102. The management server 108 may include a service manager 190, which may reside on the same machine or different machines (e.g., server computers, desktop computers, etc.). The management server 108 may be maintained by a cloud consumer of cloud 130, 140 such as an enterprise (e.g., business, company, organization, etc.). In another embodiment, the management server 108 may be maintained by a third party cloud provider. In yet another embodiment, the management server 108 may be part of the cloud provider system 104, 105.

The management server 108 may manage the deployment of services 131-137, 141-147 in the cloud 130, 140. The management server 108 may receive a request, for example, from a system administrator via a client 160, 180, describing a set of services 131, 133, 135, 137, 141, 143, 145, 147 to be deployed in the cloud 130, 140. In one implementation, the deployment of the services 131-137, 141-147 enables the execution of one or more applications via the cloud 130, 140. An image repository 106 may be populated with service deployment data to be used to deploy the services 131-137, 141-147.

The service deployment data may be described in a structured format that specifies hardware profiles of the resources including an amount of memory, a number of virtual CPUs, an amount of disk space available, as well as networks available. The service deployment data may be parsed and executed to cause the associated services 131-137, 141-147 to be deployed in the cloud 130, 140.

In one embodiment, the management server 108 may generate the service deployment data based on the deployment request and may store the service deployment data in the image repository 106. The repository 106 may reside locally or remotely, and may represent a single data structure or multiple data structures (databases, repositories, files, etc.) residing on one or more mass storage devices, such as magnetic or optical storage based disks, solid-state drives (SSDs) or hard drives. The deployment request may define the requested service type, properties, and conditions, for example. The deployment request may be received via a service deployment application programming interface (API), a graphical user interface (GUI), and/or a command line interface (CLI), for example. The deployment request may be based on a template, which may refer to a description of a disk image and meta-data for creating a cloud service 131-137, 141-147. A template may be defined by a text file, a YAML file, an XML file, or other types of files. The template may specify one or more parameters of the instance that is to be deployed (in processor cores, RAM, and disk space). Management server 108 may query the cloud provider system 104, 105 using a cloud API (or another method) to determine the hardware specifications that the specified instance will consume.

Upon receiving a request to deploy a set of services 131-137, 141-147, the service manager 190 may identify the set of services 131-137, 141-147 in the cloud 130, 140. The set of services may employ one or more virtual execution environments. The service manager 190 may generate a set of graphs to represent each service of the set of services 131-137, 141-147. The service manager may further determine, using the generated set of graphs, a set of servers for running the set of services 131-137, 141-147. Service manager 190 is further described below with reference to FIG. 2.

Figure 2:
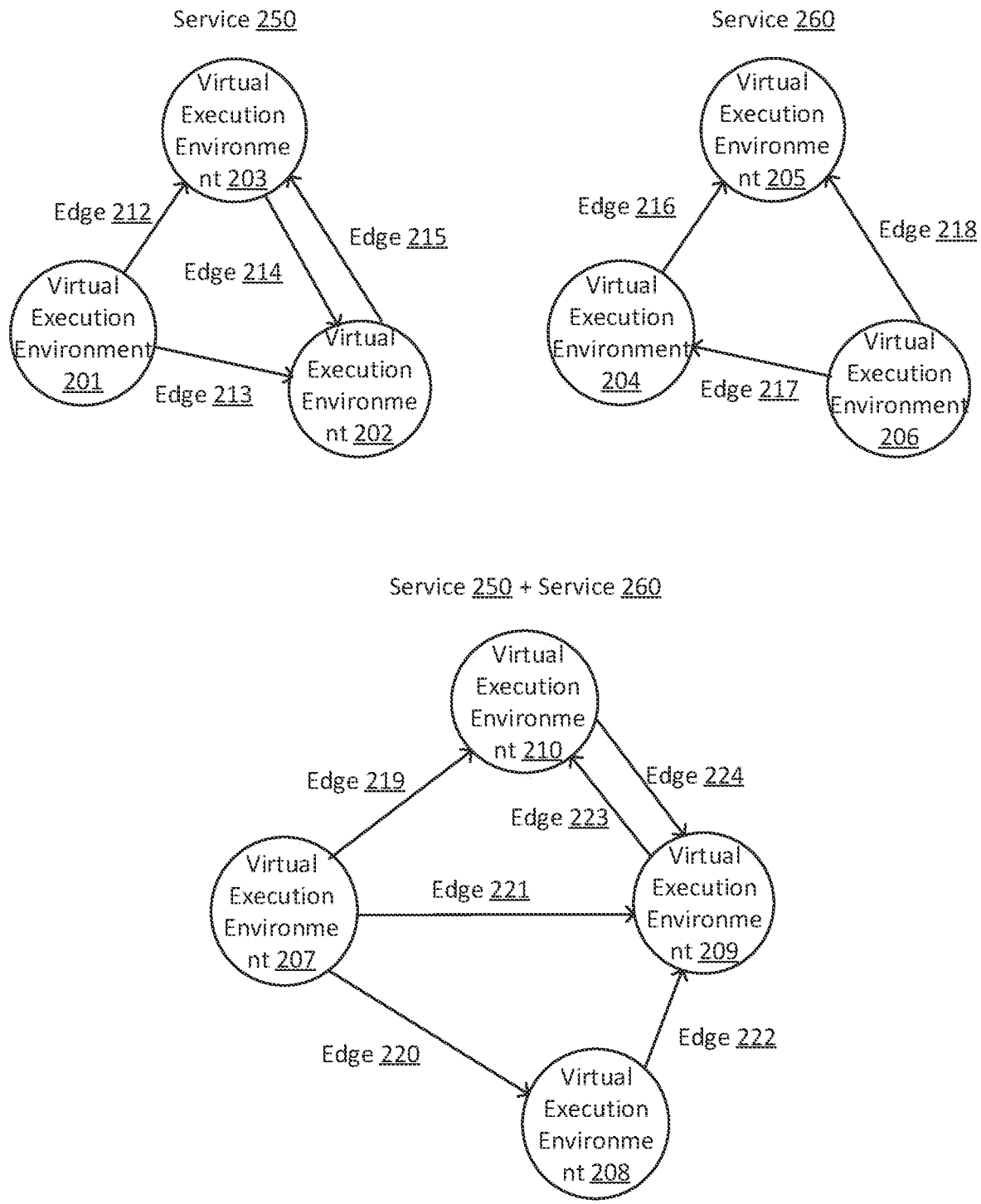
FIG. 2 depicts a high-level diagram of services of a cloud computing environment represented in graph model, according to one or more aspects of the disclosure.

FIG. 2 depicts a high-level diagram of services of a cloud computing environment represented by a graph model, according to one or more aspects of the disclosure. In certain embodiments, each service of a set of services of a cloud computing environment may be represented by a set of graphs. Each graph may represent a single service (e.g., service 250 or service 260). Each graph may include a set of nodes. Each node may represent a virtual execution environment (e.g., virtual execution environment 201-203, virtual execution environment 204-206, and virtual execution environment 207-210) employed by each service. Each virtual execution environment may be a virtual machine or a container. Each node may further be associated (e.g., by a metadata record) with a computing resource usage indicator reflecting a usage of a computing resource by the virtual execution environment. In certain embodiments, the computing resources may include a CPU usage and memory usage of the virtual execution environment. For example, for service 250, the virtual execution environment 201 may be associated with a CPU usage of 10% and a memory usage of 20%. The virtual execution environment 202 may be associated with a CPU usage of 30% and a memory usage of 60%. The virtual execution environment 203 may be associated with a CPU usage of 80% and a memory usage of 60%. As such, each virtual execution environment may be associated with varying amounts of utilized resources. In the above example, the virtual execution environment 203 is associated with a CPU usage of 80% and a memory usage of 60%, while the virtual execution environment 201 is associated with a CPU usage of 10% and a memory usage of 20%. This results in an uneven distribution of resources utilization among the virtual execution environments.

Each graph may also include a set of edges (e.g., edge 212-215) interconnecting the set of nodes of the graph. Each edge may be associated (e.g., by a metadata record) with a network usage indicator. The network usage indicator may reflect a network communication channel bandwidth used by the interconnecting virtual execution environments. For example, for service 250, the edge 212 may be associated with a network usage of 10%, the edge 213 may be associated with a network usage of 30%, the edge 214 may be associated with a network usage of 80%, and the edge 215 may be associated with a network usage of 10%. As such, each edge may be associated with varying amounts of network bandwidth utilized. In the above example, the edge 214 is associated with a network usage of 80%, while the edge 212 is associated with a network usage of 10%. This results in an uneven distribution of network bandwidth among the virtual execution environments.

In one embodiment, the service manager 200 may optimize the deployment of the services 250 and service 260 by combining the set of nodes and set of edges of the graphs representing services 250 and 260, as illustrated in FIG. 2. The service manager 200 may iterate through all possible combinations of the graphs. The service manager 200 may select one or more combinations out of the possible combinations where all of the resource requirements of each graph are satisfied. For example, if the virtual execution environment 201 in service 250 is associated with a CPU usage of 10% and a memory usage of 20%, and the virtual execution environment 204 in service 260 is associated with a CPU usage of 40% and a memory usage of 60%, then the two virtual execution environments may be combined since combining the resources utilized by each virtual execution environment will not exceed a maximum resources utilization (e.g., 100%). For example, the CPU usage in the virtual execution environment 201 is 10%, while the CPU usage in the virtual execution environment 204 is 40%. Combining the nodes (e.g., the virtual execution environments 201 and 204) will result in a new node, where the CPU usages for each virtual execution environment 201 and 204 may be added together and total 50%. Since a CPU usage of 50% may be less than the maximum CPU utilization (100%), the nodes may be combined. Similarly, the other nodes of the services 250 and 260 may be combined, such that combining each node does not result in an overloaded node (e.g., a CPU usage and memory usage each totaling over 100%).

In certain implementations, the service manager 200 may combine the edges of the services 250 and 260. For example, if an edge 213 between the virtual execution environment 201 and the virtual execution environment 202 in the service 250 is associated with a network usage of 10%, and an edge 217 between the virtual execution environment 204 and the virtual execution environment 206 is associated with a network usage of 40%, the edge 213 and the edge 217 may be combined. Combining the edges 213 and 217 will not exceed a maximum network bandwidth utilization (e.g., 100%) since adding the network usage of 10% of the edge 213 and the network usage of 40% of the edge 217 results in a combined network usage of 50%. Since a network usage of 50% may be less than the maximum network bandwidth utilization (100%), the edges may be combined. Similarly, other edges of the services 250 and 260 may be combined, such that combining each edge does not result in an overloaded edge (e.g., a network usage totaling over 100%). Therefore, a single graph of services 250 and 260 as illustrated in FIG. 2 combines nodes and edges by identifying free resources in virtual execution environments for each service 250 and 260. In one embodiment, if the nodes of the virtual execution environments or the edges of the virtual execution environments exceed the maximum resources or network bandwidth utilization, then those nodes and/or edges may not be combined in the resulting single graph. In one embodiment, the service manager 200 may optimize the deployment of multiple services including multiple virtual execution environments. Further details with regards to the service manager 200 is described with respect to FIG. 3 and FIG. 4 below.

Figure 3:
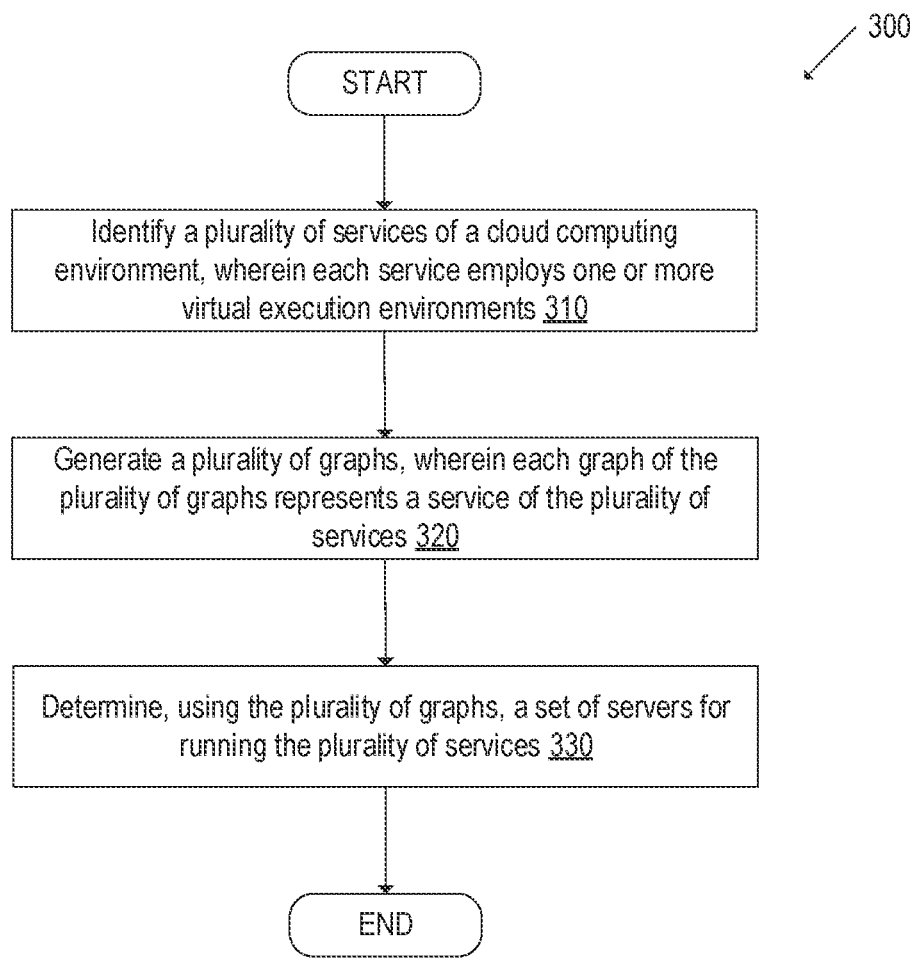
FIG. 3 depicts a process flow diagram of an example method for generating a set of servers for running services in a cloud computing environment, in accordance with one or more aspects of the disclosure.

FIG. 3 depicts a flow diagram for an illustrative example of method 300 for generating a set of servers for running services in a cloud computing environment, in accordance with one or more aspects of the disclosure. Method 300 may be performed by processing devices that may comprise hardware (e.g., circuitry, dedicated logic, programmable logic, microcode, etc.), executable code (such as is run on a general purpose computer system or a dedicated machine), or a combination of both. Method 300 and each of its individual functions, routines, subroutines, or operations may be performed by one or more processors of the computer device executing the method. In certain implementations, method 300 may each be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing methods 300 and 400 may be executed asynchronously with respect to each other.

For simplicity of explanation, the methods of this disclosure are depicted and described as a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, method 300 may be performed by service manager 190 as shown in FIG. 1.

Method 300 may be performed by processing devices of a server device or a client device and may begin at block 310.

At block 310, a processing device may identify a set of services of a cloud computing environment. In certain implementations, the set of services may employ one or more virtual execution environments. In certain implementations, the one or more virtual execution environments may include one or more virtual machines or one or more containers. In certain implementations, the processing device may identify the set of services of the cloud computing environment in response to receiving a request to deploy the set of services of the cloud computing environment.

At block 320, the processing device may generate a set of graphs. In certain implementations, the set of graphs may represent a service of the set of services identified at block 310. In certain implementations, each graph of the set of graphs may include a set of nodes and a set of edges. Each node may represent a virtual execution environment (e.g., a virtual machine or container) employed by the service of the set of services. Each node may be associated (e.g., by a metadata record) with a computing resource usage indicator, which shows a usage of a computing resource by the virtual execution environment represented by the node. For example, the computing resources may include at least one of a central processing unit (CPU), memory, and storage. In certain implementations, each edge of the graph may interconnect the nodes of the graph. Each edge may be associated (e.g., by a metadata record) with a network usage indicator. The network usage indicator may reflect a communication channel bandwidth utilized by the virtual execution environments connected by the edge.

At block 330, the processing device may identify a set of servers for running the set of services. In certain implementations, the processing device may identify the set of servers for running the set of services using the set of graphs generated at block 320. In certain implementations, the processing device may identify a minimal set of servers suitable for running the servers. In certain implementations, identifying the minimal set of servers includes combining graphs of the set of graphs into a single graph. For example, the processing device may combine two or more graphs of the set of graphs into a single graph. In certain implementations, the processing device may compare the computing resource usage indicator associated with a node of one graph to the computing resource usage indicator associated with a node of a second graph. If combining (e.g., adding) the computing resource usage indicators associated with each node of each graph does not result in a combined computing resource usage indicator that exceeds a maximum computing resource usage indicator (e.g., 100%), then the nodes may be combined. In certain implementations, the processing device may iterate through all possible combinations of the graphs in order to identify a single graph, where the computing resource usage indicator in the single graph does not exceed the maximum computing resource usage indicator. In certain implementations, the processing device may compare the network usage indicator associated with an edge of one graph to the networking usage indicator associated with an edge of a second graph. If combining (e.g., adding) the network usage indicators associated with each edge of each graph does not result in a combined network usage indicator that exceeds a maximum network usage indicator (e.g., 100%), then the edges may be combined. In certain implementations, the processing device may iterate through all possible combinations of the graphs in order to identify a single graph, where the network usage indicator in the single graph does not exceed the maximum network usage indicator. In certain implementations, if combining the computing resource usage indicators of a set of graphs and/or the network usage indicators of the set of graphs exceeds the maximum network usage indicator and/or the maximum network usage indicator, then the associated nodes and/or edges may not be combined in the single graph. In certain implementations, at least one server of the set of servers may be allocated to run two or more virtual execution environments. Allocating each server of the set of servers may be done using the single graph.

Figure 4:
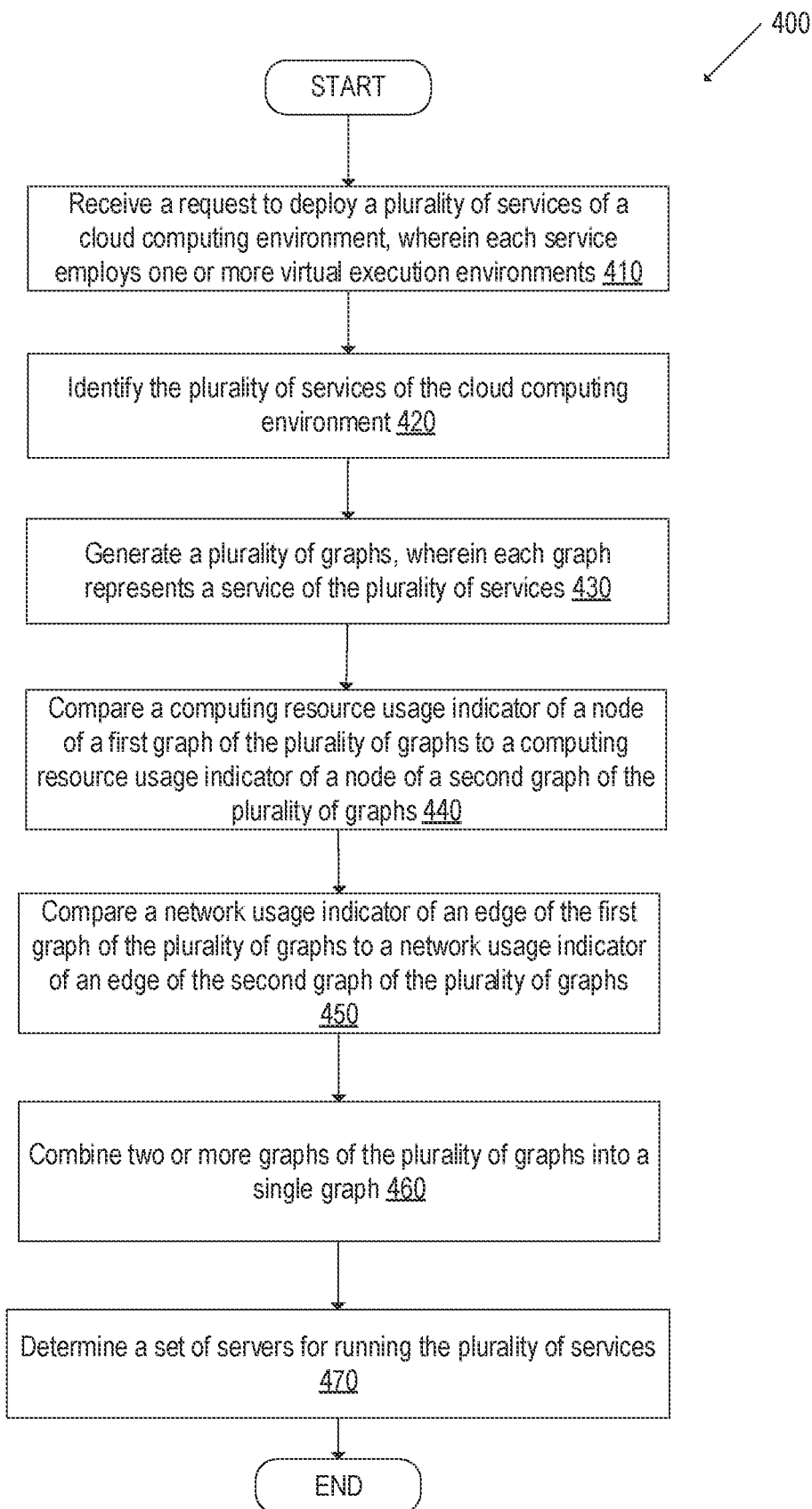
FIG. 4 depicts a process flow diagram of another example method for generating a set of servers for running services in a cloud computing environment, in accordance with one or more aspects of the disclosure.

FIG. 4 depicts a flow diagram for an illustrative example of method 400 for generating a set of servers for running services in a cloud computing environment, in accordance with one or more aspects of the disclosure. Method 400 may be performed by processing devices that may comprise hardware (e.g., circuitry, dedicated logic, programmable logic, microcode, etc.), executable code (such as is run on a general purpose computer system or a dedicated machine), or a combination of both. Method 400 and each of its individual functions, routines, subroutines, or operations may be performed by one or more processors of the computer device executing the method. In certain implementations, method 400 may each be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing methods 300 and 400 may be executed asynchronously with respect to each other.

For simplicity of explanation, the methods of this disclosure are depicted and described as a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, method 400 may be performed by service manager 190 as shown in FIG. 1.

Method 400 may be performed by processing devices of a server device or a client device and may begin at block 410.

At block 410, a processing device may receive a request to deploy a set of services of a cloud computing environment. The processing device may receive the request from a management server (e.g., the management server 108 of FIG. 1). In certain implementations, each service of the set of services may employ one or more virtual execution environments. In certain implementations, the one or more virtual execution environments may include one or more virtual machines or one or more containers.

At block 420, the processing device may identify the set of services of the cloud computing environment. The processing device may identify the set of services in response to receiving the request to deploy the set of services.

At block 430, the processing device may generate a set of graphs. In certain implementations, the set of graphs may represent a service of the set of services identified at block 420. In certain implementations, each graph of the set of graphs may include a set of nodes and a set of edges. Each node may represent a virtual execution environment (e.g., a virtual machine or container) employed by the service of the set of services. Each node may be associated (e.g., by a metadata record) with a computing resource usage indicator, which shows a usage of a computing resource by the virtual execution environment represented by the node. For example, the computing resources may include at least one of a central processing unit (CPU), memory, and storage. In certain implementations, each edge of the graph may interconnect the nodes of the graph. Each edge may be associated (e.g., by a metadata record) with a network usage indicator. The network usage indicator may reflect a communication channel bandwidth utilized by the virtual execution environments connected by the edge.

At block 440, the processing device may compare the computing resource usage indicator associated with a node of one graph of the set of graphs to the computing resource usage indicator associated with a node of a second graph of the set of graphs. If combining (e.g., adding) the computing resource usage indicators associated with each node of each graph does not result in a combined computing resource usage indicator that exceeds a maximum computing resource usage indicator (e.g., 100%), then the nodes may be combined. In certain implementations, the processing device may iterate through all possible combinations of the graphs in order to identify a single graph, where the computing resource usage indicator in the single graph does not exceed the maximum computing resource usage indicator.

At block 450, the processing device may compare the network usage indicator associated with an edge of one graph of the set of graphs to the networking usage indicator associated with an edge of a second graph of the set of graphs. If combining (e.g., adding) the network usage indicators associated with each edge of each graph does not result in a combined network usage indicator that exceeds a maximum network usage indicator (e.g., 100%), then the edges may be combined. In certain implementations, the processing device may iterate through all possible combinations of the graphs in order to identify a single graph, where the network usage indicator in the single graph does not exceed the maximum network usage indicator.

At block 460, the processing device may combine two or more graphs of the set of graphs into a single graph. In certain implementations, the processing device may combine the two or more graphs into the single graph if combining the computing resource usage indicator associated with each node of the two or more graphs does not exceed the maximum computing resource usage indicator. In certain implementations, the processing device may combine the two or more graphs into the single graph if combining the network usage indicator associated with each edge of the two or more graphs does not exceed the maximum network usage indicator.

At block 470, the processing device may identify a set of servers for running the set of services. In certain implementations, the processing device may identify the set of servers for running the set of services using the single graph generated at block 460. In certain implementations, the processing device may identify a minimal set of servers suitable for running the servers. In certain implementations, at least one server of the set of servers may be allocated to run two or more virtual execution environments. Allocating each server of the set of servers may be done using the single graph.

Figure 5:
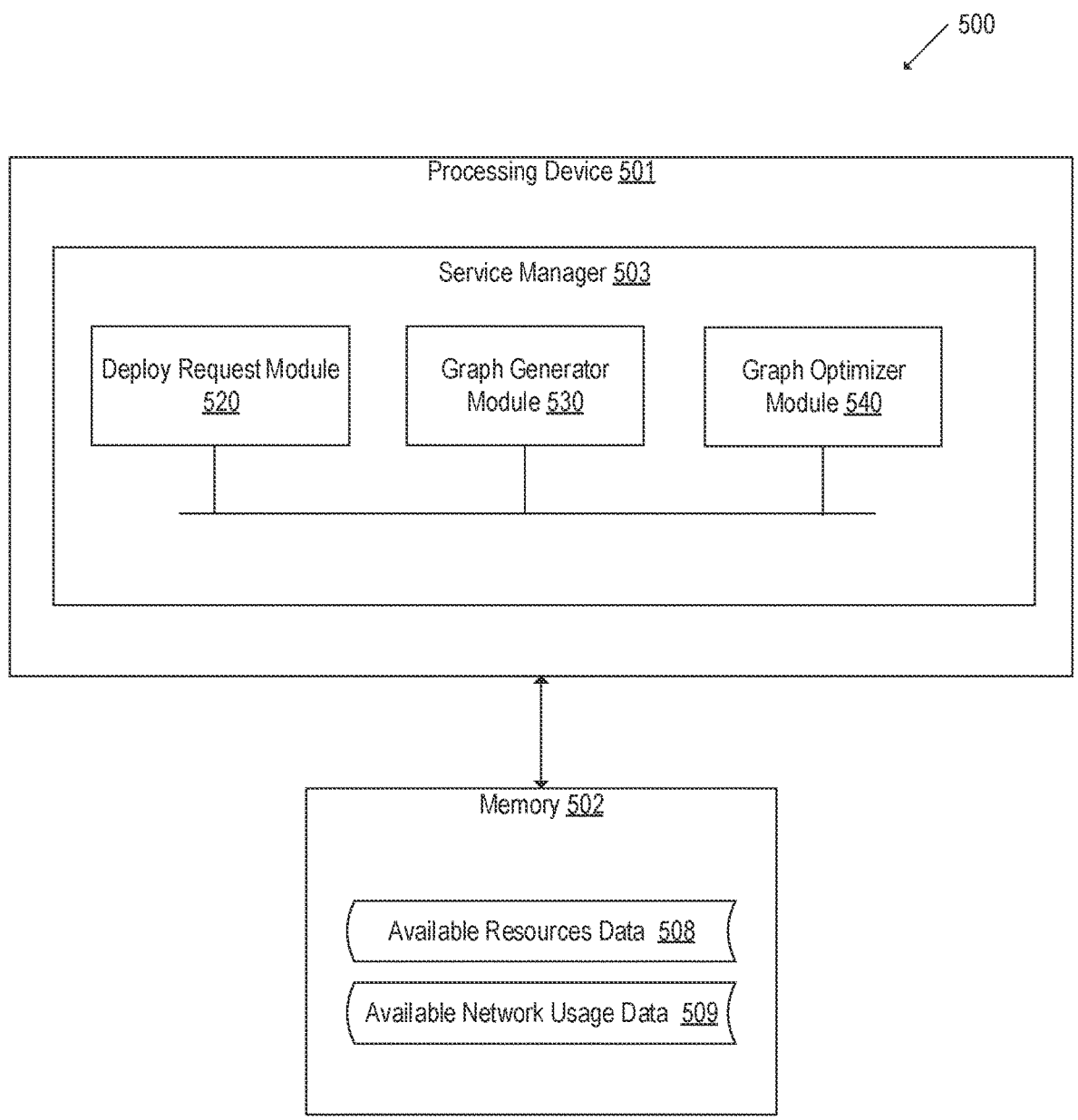
FIG. 5 depicts a block diagram of an example computer system in accordance with one or more aspects of the disclosure.

FIG. 5 depicts a block diagram of a computer system 500 operating in accordance with one or more aspects of the present disclosure. Computer system 500 may perform the same functions as management server 108 of FIG. 1, and may include one or more processing devices 501 and one or more memory devices 502. In the example shown, the processing device 501 of computer system 500 may include a service manager 503. Service manager 503 may perform the same functions as resource manager 190 described with respect to FIG. 1.

Service manager 503 may include a deploy request module 520, a graph generator module 530, and a graph optimizer module 540. The deploy request module 520 may enable the processing device 501 to receive a request to deploy a set of services in a cloud computing environment. The graph generator module 530 may enable the processing device 501 to generate a set of graphs, wherein each graph of the set of graphs represents a service of the set of services. The graph generator module 530 may further associate each node of each graph with a computing resource usage indicator. The graph generator module 530 may further associate each edge of each graph with a network usage indicator.

The graph optimizer module 540 may enable the processing device 501 to identify, using the set of graphs, a set of servers for running the set of services. The graph optimizer module 540 may further combine graphs of the set of graphs into a single graph. The graph optimizer module 540 may further determine that each node and each edge of the single graph do not exceed a maximum computing resource usage and maximum network usage. The graph optimizer module 540 may retrieve data regarding the computing resource usage and network usage associated (e.g., by a metadata record) with each node and each edge from an available resources data 508 and an available network usage data 509, which may be located on a memory device (e.g., the memory device 502).

Figure 6:
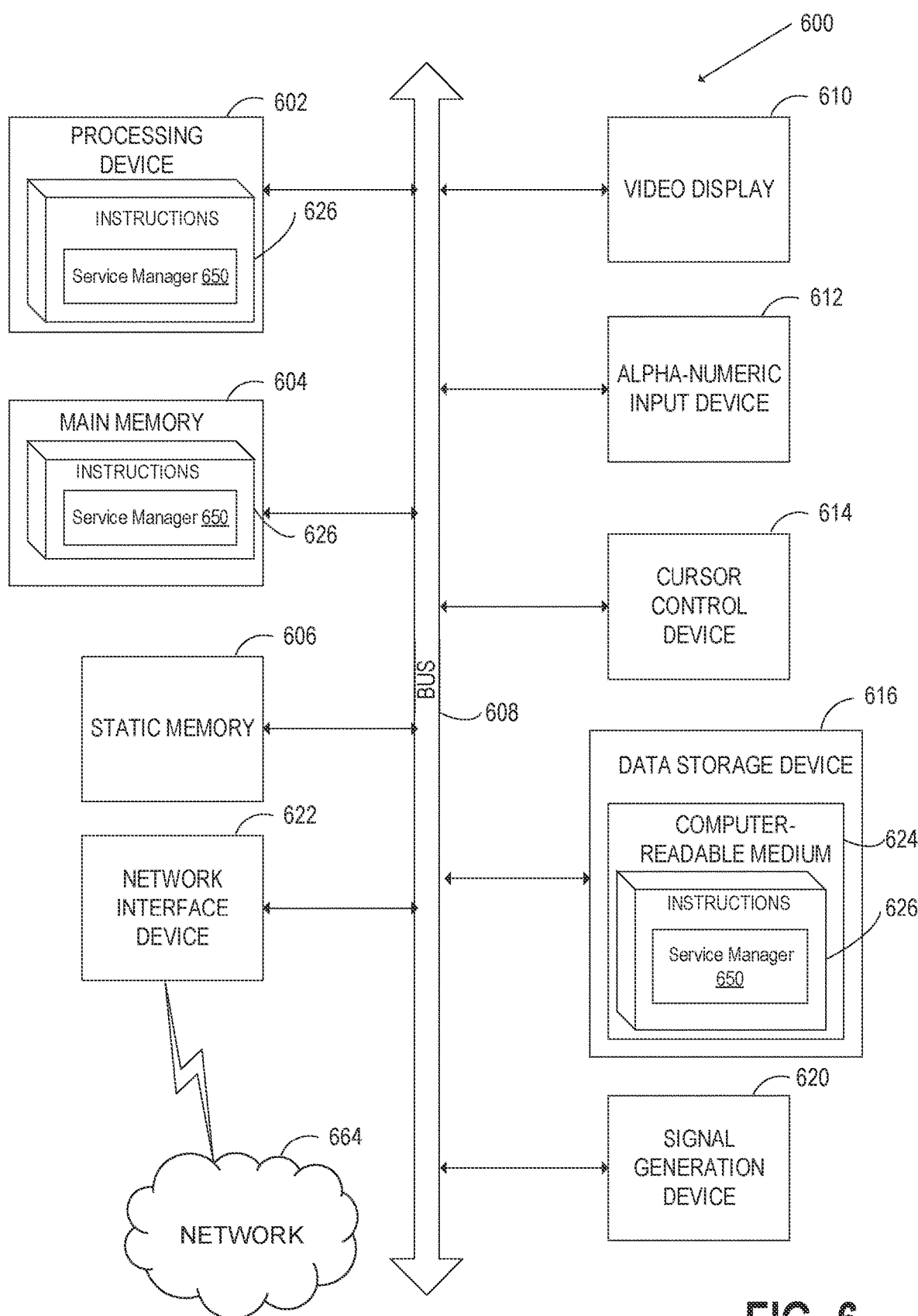
FIG. 6 depicts a block diagram of an illustrative computing device operating in accordance with the examples of the disclosure.

FIG. 6 depicts a block diagram of a computer system operating in accordance with one or more aspects of the disclosure. In various illustrative examples, computer system 600 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 and 400 for service manager 650 (which may implement the functions of service manager 190 of FIG. 1 and/or service manager 503 of FIG. 5) and the modules illustrated in FIG. 5.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "detecting," "verifying," "evicting," "selecting," "restricting," "receiving," "updating," "providing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation. Furthermore, "requestor" and "initiator" are used interchangeably throughout this disclosure.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and 400 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the disclosure is not limited to the examples and implementations described. The scope of the disclosure should be determined with reference to the following claims, along with the full scope of equivalents to which the claims are entitled.

What is claimed is:

1. A method comprising:
identifying, by a processing device, a plurality of services of a cloud computing environment, wherein each service of the plurality of services employs one or more virtual execution environments;
generating a plurality of graphs, wherein each graph of the plurality of graphs represents a service of the plurality of services, wherein each graph comprises a plurality of nodes, such that each node represents a corresponding virtual execution environment of the one or more virtual execution environments employed by the service, and wherein each node is associated with a computing resource usage indicator reflecting a usage of a computing resource by the corresponding virtual execution environment;
combining two or more graphs of the plurality of graphs into a single graph, wherein each node of the single graph represents a service that does not exceed a maximum computing resource usage; and
determining, using the plurality of graphs, a set of servers for running the plurality of services.

2. The method of claim 1, wherein the set of servers is a minimal set suitable for running the plurality of services.

3. The method of claim 1, wherein at least one server of the set of servers is allocated to run two or more virtual execution environments.

4. The method of claim 1, wherein the graph further comprises a plurality of edges interconnecting the nodes of the plurality of nodes, such that each edge is associated with a network usage indicator reflecting a communication channel bandwidth utilized by respective virtual execution environments.

5. The method of claim 4,
wherein each edge of the single graph does not exceed a maximum network usage.

6. The method of claim 1, further comprising:
receiving, by the processing device, a request to deploy the plurality of services of the cloud computing environment.

7. The method of claim 1, wherein the usage of the computing resource comprises at least one of: a central processing unit (CPU) usage or a memory usage.

8. A system comprising:
a memory; and
a processing device communicably coupled to the memory to:
identify a plurality of services of a cloud computing environment, wherein each service of the plurality of services employs one or more virtual execution environments;
generate a plurality of graphs, wherein each graph of the plurality of graphs represents a service of the plurality of services, wherein each graph comprises a plurality of nodes, such that each node represents a corresponding virtual execution environment of the one or more virtual execution environments employed by the service, and wherein each node is associated with a computing resource usage indicator reflecting a usage of a computing resource by the corresponding virtual execution environment;
combine two or more graphs of the plurality of graphs into a single graph, wherein each node of the single graph represents a service that does not exceed a maximum computing resource usage; and
determine, using the plurality of graphs, a set of servers for running the plurality of services.

9. The system of claim 8, wherein the set of servers is a minimal set suitable for running the plurality of services.

10. The system of claim 8, wherein at least one server of the set of servers is allocated to run two or more virtual execution environments.

11. The system of claim 8, wherein the graph further comprises a plurality of edges interconnecting the nodes of the plurality of nodes, such that each edge is associated with a network usage indicator reflecting a communication channel bandwidth utilized by respective virtual execution environments.

12. The system of claim 11,
wherein each edge of the single graph does not exceed a maximum network usage.

13. The system of claim 8, wherein the processing device is further to:
receive a request to deploy the plurality of services of the cloud computing environment.

14. The system of claim 8, wherein the usage of the computing resource comprises at least one of: a central processing unit (CPU) usage or a memory usage.

15. A non-transitory machine-readable storage medium storing instructions that cause a processing device to:
identify, by the processing device, a plurality of services of a cloud computing environment, wherein each service of the plurality of services employs one or more virtual execution environments;
generate a plurality of graphs, wherein each graph of the plurality of graphs represents a service of the plurality of services, wherein each graph comprises a plurality of nodes, such that each node represents a corresponding virtual execution environment of the one or more virtual execution environments employed by the service, and wherein each node is associated with a computing resource usage indicator reflecting a usage of a computing resource by the corresponding virtual execution environment;
combine two or more graphs of the plurality of graphs into a single graph, wherein each node of the single graph represents a service that does not exceed a maximum computing resource usage; and
determine, using the plurality of graphs, a set of servers for running the plurality of services.

16. The non-transitory machine-readable storage medium of claim 15, wherein the set of servers is a minimal set suitable for running the plurality of services.

17. The non-transitory machine-readable storage medium of claim 15, wherein at least one server of the set of servers is allocated to run two or more virtual execution environments.

18. The non-transitory machine-readable storage medium of claim 15, wherein the graph further comprises a plurality of edges interconnecting the nodes of the plurality of nodes, such that each edge is associated with a network usage indicator reflecting a communication channel bandwidth utilized by respective virtual execution environments.

19. The non-transitory machine-readable storage medium of claim 18,
wherein each edge of the single graph does not exceed a maximum network usage.

20. The non-transitory machine-readable storage medium of claim 15, wherein the usage of the computing resource comprises at least one of: a central processing unit (CPU) usage or a memory usage.

* * * * *